US012749279B2

(12) United States Patent
Lin et al.

(10) Patent No.: US 12,749,279 B2
(45) Date of Patent: Sep. 29, 2026

(54) IDENTIFYING ANOMALY LOCATION

(71) Applicant: Hewlett-Packard Development Company, L.P., Spring, TX (US)

(72) Inventors: Qian Lin, Palo Alto, CA (US); Deangeli Gomes Neves, Campinas (BR); Tharsis Salathiel de Souza Viana, Campinas (BR); Augusto Valente, Campinas (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 443 days.

(21) Appl. No.: 18/253,276

(22) PCT Filed: Nov. 25, 2020

(86) PCT No.: PCT/US2020/062125

§ 371 (c)(1),
(2) Date: May 17, 2023

(87) PCT Pub. No.: WO2022/115100

PCT Pub. Date: Jun. 2, 2022

(65) Prior Publication Data

US 2023/0419636 A1 Dec. 28, 2023

(51) Int. Cl.
*G06V 10/25* (2022.01)
*G06T 7/33* (2017.01)

(52) U.S. Cl.
CPC .............. *G06V 10/25* (2022.01); *G06T 7/337* (2017.01); *G06T 2207/20132* (2013.01)

(58) Field of Classification Search
CPC ...... G06V 10/25; G06V 10/82; G06V 10/993; G06T 7/337; G06T 2207/20132; G06T 7/0004; G06T 2207/20084; G06T 7/155; G06T 7/11
See application file for complete search history.

(56) References Cited

U.S. PATENT DOCUMENTS

| | | | | |
|---|---|---|---|---|
| 10,181,185 | B2 | 1/2019 | Park et al. | |
| 10,552,730 | B2 | 2/2020 | Yumer et al. | |
| 10,789,288 | B1 * | 9/2020 | Ranzinger | G06F 16/24578 |
| 11,238,346 | B2 * | 2/2022 | Towal | G06N 3/04 |
| 11,521,377 | B1 * | 12/2022 | Wang | G06V 20/13 |
| 11,922,368 | B1 * | 3/2024 | Wozniak | G06N 20/20 |
| 12,008,079 | B1 * | 6/2024 | Kolouri | G06F 18/217 |
| 12,125,193 | B2 * | 10/2024 | Chen | G06V 10/40 |
| 12,182,940 | B2 * | 12/2024 | Li | G06V 20/64 |
| 2017/0024649 | A1 | 1/2017 | Yan et al. | |
| 2018/0330238 | A1 * | 11/2018 | Luciw | G06N 3/044 |
| 2019/0130279 | A1 * | 5/2019 | Beggel | G06V 10/82 |

(Continued)

FOREIGN PATENT DOCUMENTS

| | | | |
|---|---|---|---|
| CN | 107463945 | A | 12/2017 |
| CN | 110992354 | A | 4/2020 |

(Continued)

*Primary Examiner* — Mia M Thomas
(74) *Attorney, Agent, or Firm* — Quarles & Brady LLP

(57) ABSTRACT

A region of interest is extracted from a captured image of a physical object. An autoencoder model is applied to the extracted region of interest to reconstruct the region of interest. A location of an anomaly of the physical object within the extracted region of interest, if any, is identified based on the extracted and reconstructed regions of interest.

20 Claims, 6 Drawing Sheets

(56) References Cited

U.S. PATENT DOCUMENTS

| | | | | |
|---|---|---|---|---|
| 2019/0164287 | A1* | 5/2019 | Gregson | G16H 30/40 |
| 2020/0051017 | A1* | 2/2020 | Dujmic | G06N 3/08 |
| 2020/0111210 | A1* | 4/2020 | Maximo | G06N 3/0455 |
| 2020/0134804 | A1 | 4/2020 | Song et al. | |
| 2020/0160505 | A1 | 5/2020 | Kohler et al. | |
| 2020/0193299 | A1* | 6/2020 | Geva | G06F 3/015 |
| 2020/0207358 | A1* | 7/2020 | Katz | G06V 20/56 |
| 2020/0302176 | A1* | 9/2020 | Yang | G06N 3/045 |
| 2020/0364842 | A1 | 11/2020 | Chaton | |
| 2021/0160018 | A1* | 5/2021 | Han | G06Q 20/108 |
| 2021/0193298 | A1* | 6/2021 | Sun | G16H 50/20 |
| 2021/0334598 | A1* | 10/2021 | Tan | G06V 10/774 |
| 2021/0342570 | A1* | 11/2021 | Gregson | G06N 3/084 |
| 2021/0358177 | A1* | 11/2021 | Park | G06T 11/60 |
| 2021/0374928 | A1* | 12/2021 | Hida | G06F 18/2433 |
| 2021/0396528 | A1* | 12/2021 | St. Romain | G06F 16/23 |
| 2022/0084173 | A1* | 3/2022 | Liang | G06N 3/045 |
| 2022/0148241 | A1* | 5/2022 | Park | G06T 11/00 |
| 2022/0272355 | A1* | 8/2022 | Singh | H04N 19/186 |
| 2023/0102055 | A1* | 3/2023 | Park | G06T 11/60 345/428 |
| 2023/0230224 | A1* | 7/2023 | Erol | G06T 7/337 382/141 |
| 2023/0245363 | A1* | 8/2023 | Park | G06T 11/00 345/629 |
| 2023/0419636 | A1* | 12/2023 | Lin | G06T 7/11 |
| 2024/0005587 | A1* | 1/2024 | Kulkarni | G06T 13/80 |
| 2024/0015318 | A1* | 1/2024 | Pourreza | H04N 19/172 |
| 2024/0160194 | A1* | 5/2024 | Bakhshmand | G06N 3/0455 |
| 2024/0289973 | A1* | 8/2024 | Liu | A61F 2/6607 |
| 2025/0348980 | A1* | 11/2025 | Chan | G06N 3/0455 |
| 2026/0017492 | A1* | 1/2026 | Fortkort | G06F 18/25 |

FOREIGN PATENT DOCUMENTS

| | | | | |
|---|---|---|---|---|
| CN | 121236010 | A * | 12/2025 | |
| WO | 2020/081343 | A1 | 4/2020 | |
| WO | WO-2022115100 | A1 * | 6/2022 | G06T 7/0004 |
| WO | WO-2025200565 | A1 * | 10/2025 | G01B 11/00 |
| WO | WO-2025240498 | A1 * | 11/2025 | G06T 5/70 |

* cited by examiner

IDENTIFYING ANOMALY LOCATION

BACKGROUND

Modern-day electronic and other types of devices are often manufactured by assembling multiple components together. A defect or other anomaly within any component, or as a result of attaching components together, can result in failure of the overall device. Therefore, constituent components of a device are often tested for anomalies before inclusion in the device, and after manufacture the device itself is also tested.

BACKGROUND

As noted in the background, devices and device components, which are more generally physical objects, are often tested for defects and other anomalies. As one example, an inkjet printhead die may be attached to an inkjet cartridge body during assembly of an inkjet cartridge. As part of this attachment process, a flexible ribbon cable may be secured to the printhead die and encapsulated with a material at the connection point between the cable and the die to form what is known as an encap. The encap protects the electrical connection between the cable and the printhead die from ink during usage of the inkjet cartridge in a printing device to eject ink.

One way by which components may be tested for anomalies like defects is to use machine vision, due to the large number of components that have to be inspected and the small size of potential anomalies. Machine vision involves capturing an image of a component and then performing image processing to detect whether the component has any anomalies. For example, with respect to the encap of an inkjet cartridge, machine vision may be used to detect defects in the encap that may permit ink to reach the electrical connections between the cable and the printhead die, which can result in the failure of the cartridge or even the printing device of which it is a part.

Techniques described herein permit anomalies of physical objects to be detected, and their locations on the objects to be identified. A region of interest (ROI) is extracted from a captured image of a physical object, and an autoencoder model is applied to the extracted ROI to reconstruct the ROI.

The location of an anomaly of the physical object, if any, is identified within the extracted ROI based on the extracted and reconstructed ROIs.

Figure 1:
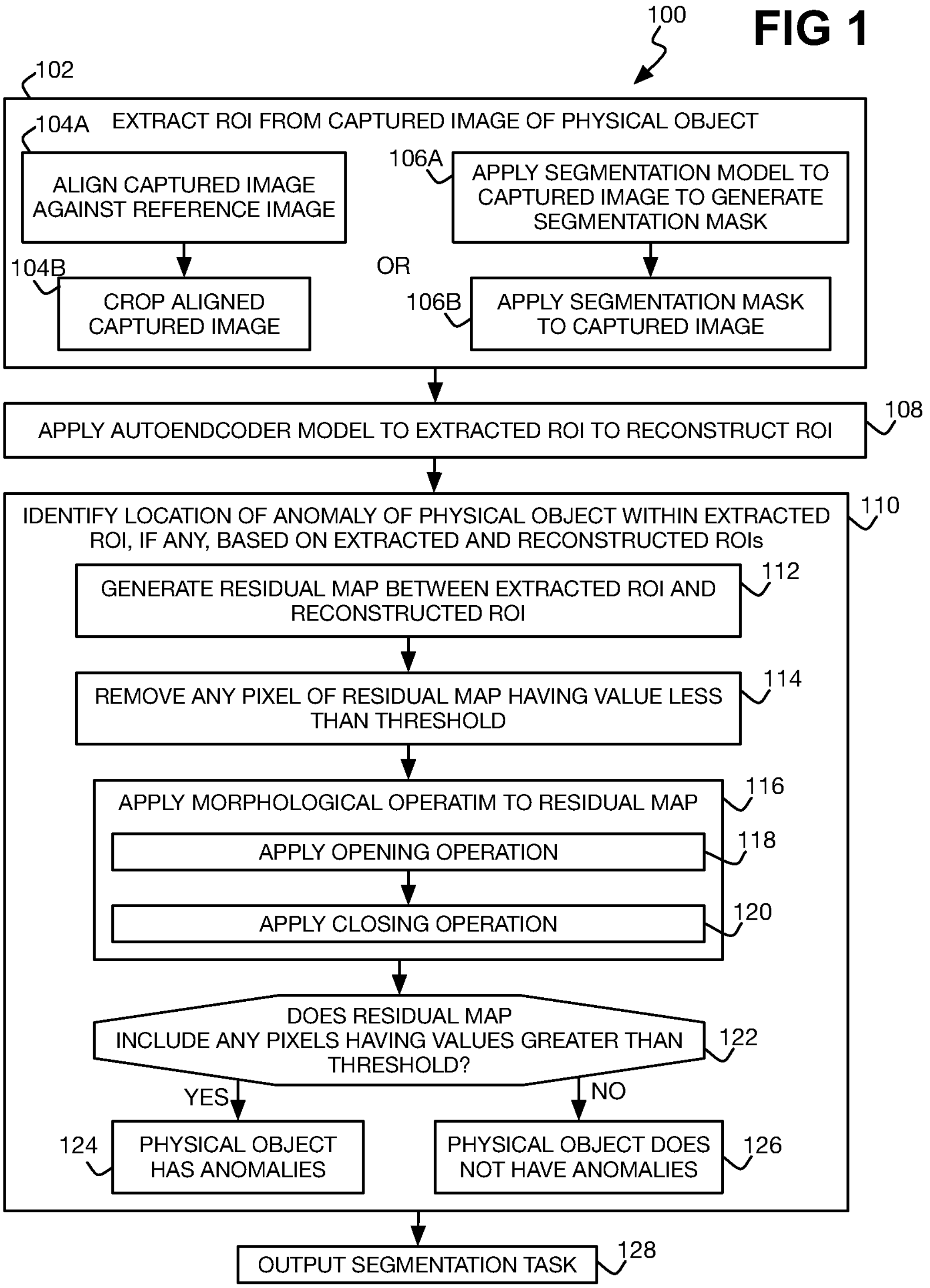
FIG. 1 is a flowchart of an example method for identifying the location of an anomaly within a physical object, if any.

FIG. 1 shows an example method 100 for identifying the location of an anomaly within a physical object, if the object has any such anomaly. The method 100 can be implemented as program code stored on a non-transitory computer-readable data storage medium and executed by a processor of a computing device. The computing device may be a computer that is communicatively connected to an image sensor that captures images of physical objects as or after they are manufactured, for instance, to identify any objects having defects or other anomalies.

Physical objects detected as having anomalies may be separated from anomaly-free objects so that they are discarded and not subsequently used, or so that they can be inspected at the locations of the detected anomalies for potential repair or manufacturing process analysis. For example, there may be an expected defect rate during the manufacture of physical objects. If the defect rate suddenly increases or exceeds a threshold, the manufacturing process may be analyzed and modified in an automated or manual manner to return the defect rate back to normal.

Therefore, the method 100 provides for technological improvements in a number of different ways. For instance, the method 100 can ensure that manufactured physical objects are less likely to include defects and other anomalies. The method 100 can similarly ensure that subsequently manufactured devices are less likely to be defective due to the inclusion of defective constituent components. The method 100 can also improve the manufacturing process of physical objects, by providing an automated or manual feedback loop as to the quality of the objects being manufactured. The method 100 has proven to be more accurate and faster than competing machine vision-based defect identification techniques.

The method 100 includes extracting an ROI from a captured image of a physical object (102). The ROI is a prespecified area within the captured image that is to be inspected for potential anomalies of the physical object. The captured image may include other parts of the physical object that are not of interest, for instance, and may similarly include background regions that are not of interest. Therefore, the ROI is extracted from the captured image to focus the part of the image that is subsequently analyzed.

The ROI may be extracted from the captured image on one of two ways, by performing parts 104A and 104B, collectively referred to as the parts 104, or by performing parts 106A and 106B, collectively referred to as the parts 106. As to the former, the method 100 can include aligning the captured image against a reference image of another physical object of the same type (104A). For example, a transformation matrix may be calculated that aligns the captured image to the reference image. The method 100 can include then cropping the aligned image based on a bounding box identifying a corresponding ROI within the reference image (104B). For example, an inverse of the calculated transformation matrix may be applied to the bounding box as defined on the reference image and the captured image then cropped using the inverse-applied bounding box. The cropped aligned image constitutes the ROI.

As to the second way in which the ROI may be extracted from the captured image, the method 100 can include applying an object segmentation model to the captured image to generate a segmentation mask (106A), and then applying the segmentation mask to the captured image. The object segmentation model may instead output the ROI of the captured image, instead of a segmentation mask that is then applied to the captured image. The object segmentation model may be a regional convolutional neural network (R-CNN) trained using training images of physical objects of the same type as the physical object of the captured image, and on which corresponding ROIs have been preidentified. When an objection segmentation model is used to extract the ROI from the captured image, no reference image has to be provided, as compared to the first way in which the ROI may be extracted.

Figure 2A:
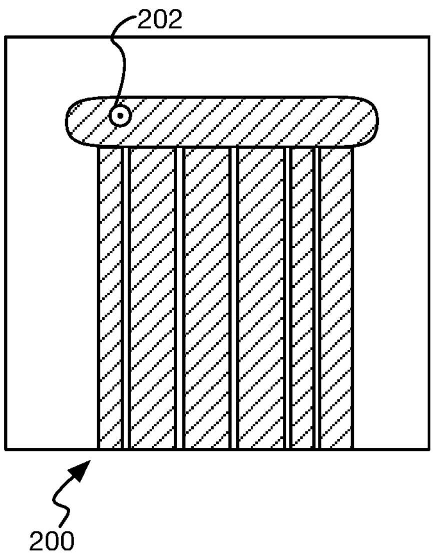
FIGS. 2A, 2B, 2C, and 2D are diagrams depicting example region of interest (ROI) extraction from a captured image of a physical object, at which the object may have an anomaly.
Figure 2B:
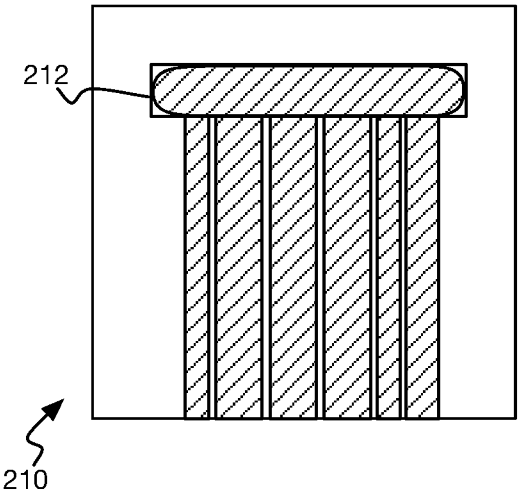

FIGS. 2A-2D show example performance of the ROI extraction of part 102. As to the first way in which the ROI may be extracted from a captured image, FIG. 2A shows an example captured image 200 of an inkjet cartridge, including an encap, and FIG. 2B shows an example reference image 210 of an inkjet cartridge of the same type (e.g., of the same model, and which may be manufactured in the same way and/or at the same facility), and also including an encap. A preidentified bounding box 212 encapsulating the encap of the cartridge within the reference image 210 is depicted in FIG. 2B as well. The encaps of the images 200 and 210 differ in that the former includes a defect or anomaly at location 202, whereas the latter does not.

Figure 2C:
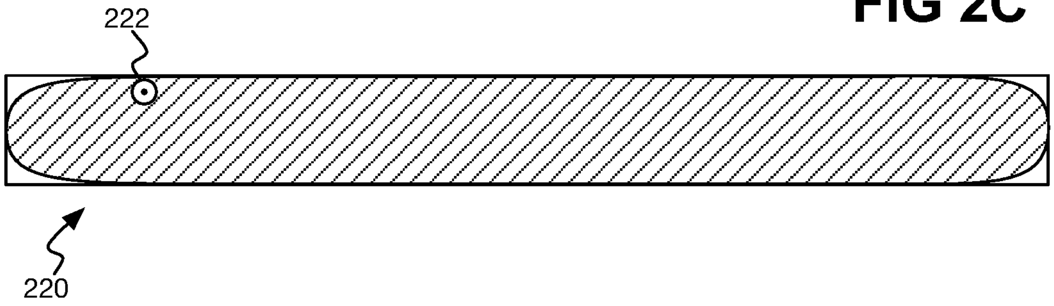

A transformation matrix can be calculated that aligns the captured image 200 to the reference image 210, and an inverse of the transformation matrix applied to the bounding box 212 as preidentified within the reference image 210. The captured image 200 can then be cropped in correspondence with resulting inverse-applied bounding box 212 to extract the ROI from the captured image 200. FIG. 2C shows an example extracted ROI 220 of the captured image 200, which includes the encap of the inkjet cartridge within the captured image 200, in correspondence with the bounding box 212 preidentified within the reference image 210. The extracted ROI 220 includes the location 222 of the anomaly of the encap, in correspondence with the location 202 of the captured image 200.

Figure 2D:
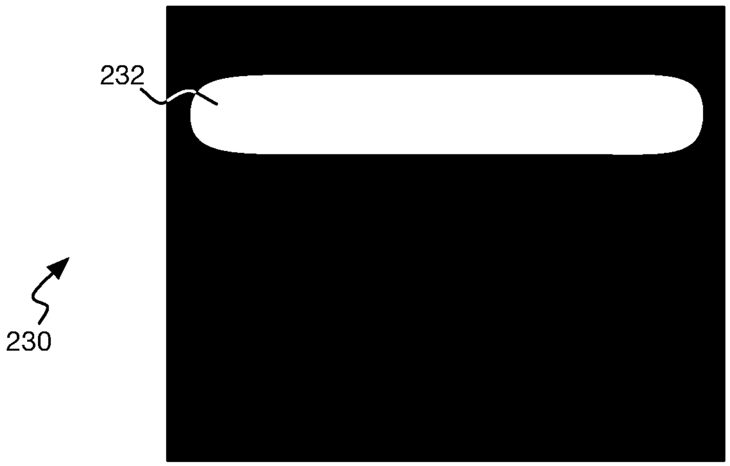

As to the second way in which the ROI may be extracted from a captured image, an object segmentation model may instead be applied to the captured image 200 of FIG. 2A. FIG. 2D shows an example segmentation mask 230 that may result from application of the segmentation model to the captured image 200, where a white region 232 indicates the ROI. The segmentation mask 230 can then be applied to the captured image 200 to extract the ROI by effectively cropping the captured image 200 in correspondence with the mask 230. The resulting extracted ROI is the same as the ROI 220 of FIG. 2C, except that the ROI is not rectangular and instead conforms to the shape of the segmentation mask 230. The reference image 210 of FIG. 2B is not used when a segmentation model is applied to the captured image 200 to extract the ROI.

FIGS. 3A, 3B, 3C, 3D, and 3E show portions of different example training images 310, 320, 330, 340, and 350, respectively, for training an object segmentation model for extracting an ROI from a captured image. The training images 310, 320, 330, 340, and 350 specifically show portions of encaps of inkjet print cartridges. The training images 310, 320, 330, 340, and 350 have preidentified ROIs 312, 322, 332, 342, and 352, respectively, that are used during model training for the generation of corresponding segmentation masks. An object segmentation model can better identify which parts of an encap should be included within an ROI, as opposed to including the entirety of the ROI as is the case when a reference image is instead used for ROI extraction from a captured image.

Figure 3A:
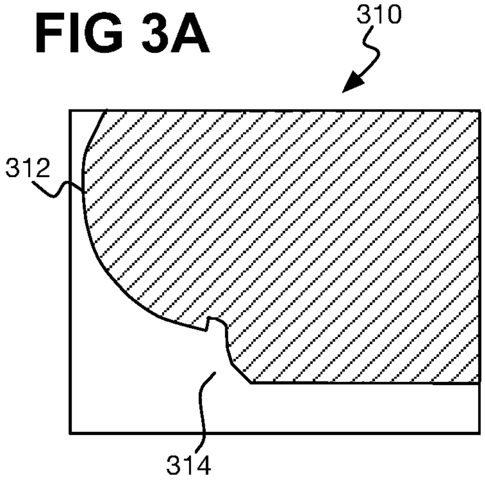
FIGS. 3A, 3B, 3C, 3D, and 3E are diagrams of example training images for training a segmentation model to extract an ROI from a captured image of a physical object, at which the object may have an anomaly.
Figure 3B:
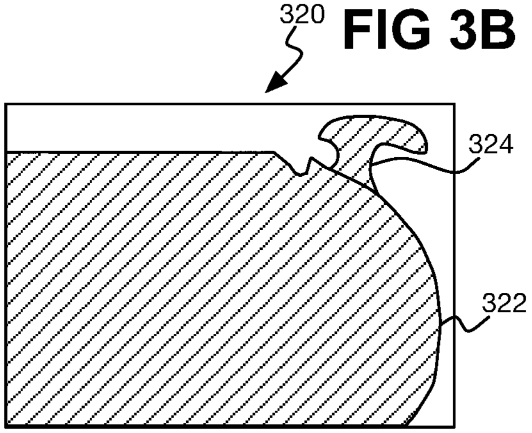
Figure 3C:
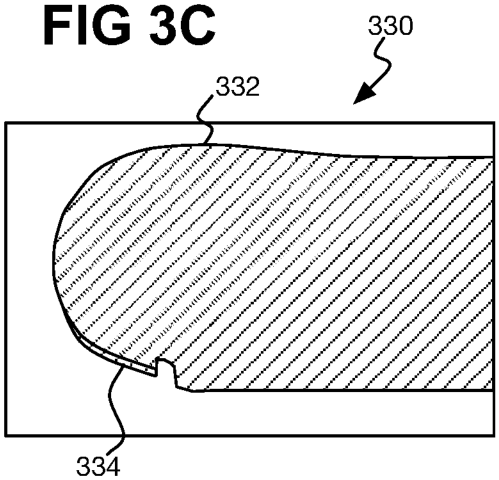
Figure 3D:
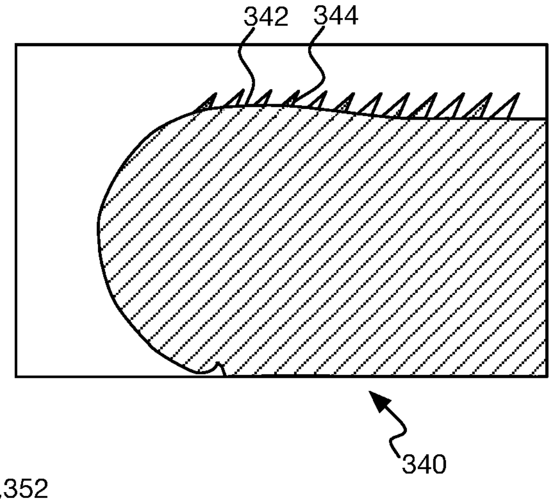
Figure 3E:
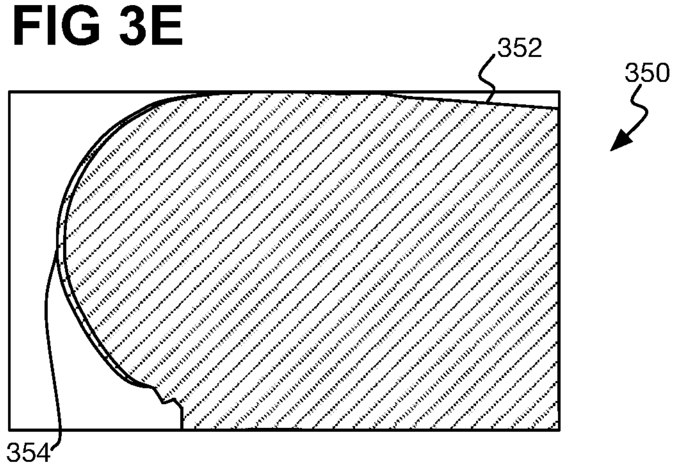

For instance, the preidentified ROI 312 of FIG. 3A excludes a spurious region 314 at the lower left of the encap in the image 310, which is not considered a defect or other anomaly affecting encap quality. Similarly, the preidentified ROI 322 of FIG. 3B excludes a spurious region 324 at the upper right of the encap in the image 320, and the preidentified ROI 332 of FIG. 3C excludes a spurious region 334 at the lower left of the encap in the image 330. The preidentified ROI 342 of FIG. 3D excludes spikes or ridges 344 at the boundary of the encap in the image 340, which are not considered defects or other anomalies affecting encap quality. Similarly, the preidentified ROI 352 of FIG. 3E excludes porosity 354 at the boundary of the encap in the image 350, which is not considered a defect or other anomaly affecting encap quality. Therefore, the object segmentation model can be trained to more accurately extract an ROI from a captured image, such as via outputting a segmentation mask that upon application to the captured image results in more accurate ROI extraction.

Referring back to FIG. 1, the method 100 includes applying an autoencoder model to the extracted ROI to reconstruct the ROI (108). The autoencoder model includes an encoder phase that generates an internal representation from the extracted ROI, and a decoder phase that generates the reconstructed ROI from this internal representation. The autoencoder can be a fully convolutional network without a linear layer, so that the input images do not have to be resized. The autoencoder model is trained using training images of anomaly-free (e.g., defect-free) physical objects of the same type as the physical object of the captured image. Therefore, the reconstructed ROI will largely be identical to the extracted ROI except at locations where the extracted ROI includes defects or other anomalies, because the autoencoder model will not have been trained on any such anomalies. More specifically, the autoencoder model is able to encode and decode high-frequency components of the training images with good precision.

Corresponding high-frequency components of the extracted ROI will thus be well represented within the reconstructed ROI output by the autoencoder model upon application of the model to the extracted ROI. However, high-frequency components of the extracted ROI that correspond to defects and other anomalies will not be well represented within the reconstructed ROI output by the autoencoder model. Usage of the autoencoder model to detect anomalies may therefore assume that the anomalies have high frequency—i.e., that the anomalies are not represented as relatively large amorphous regions of slowly changing intensity in the captured image. Usage of the model may further assume that the captured image has a similar background to that of the training images.

Figure 4:
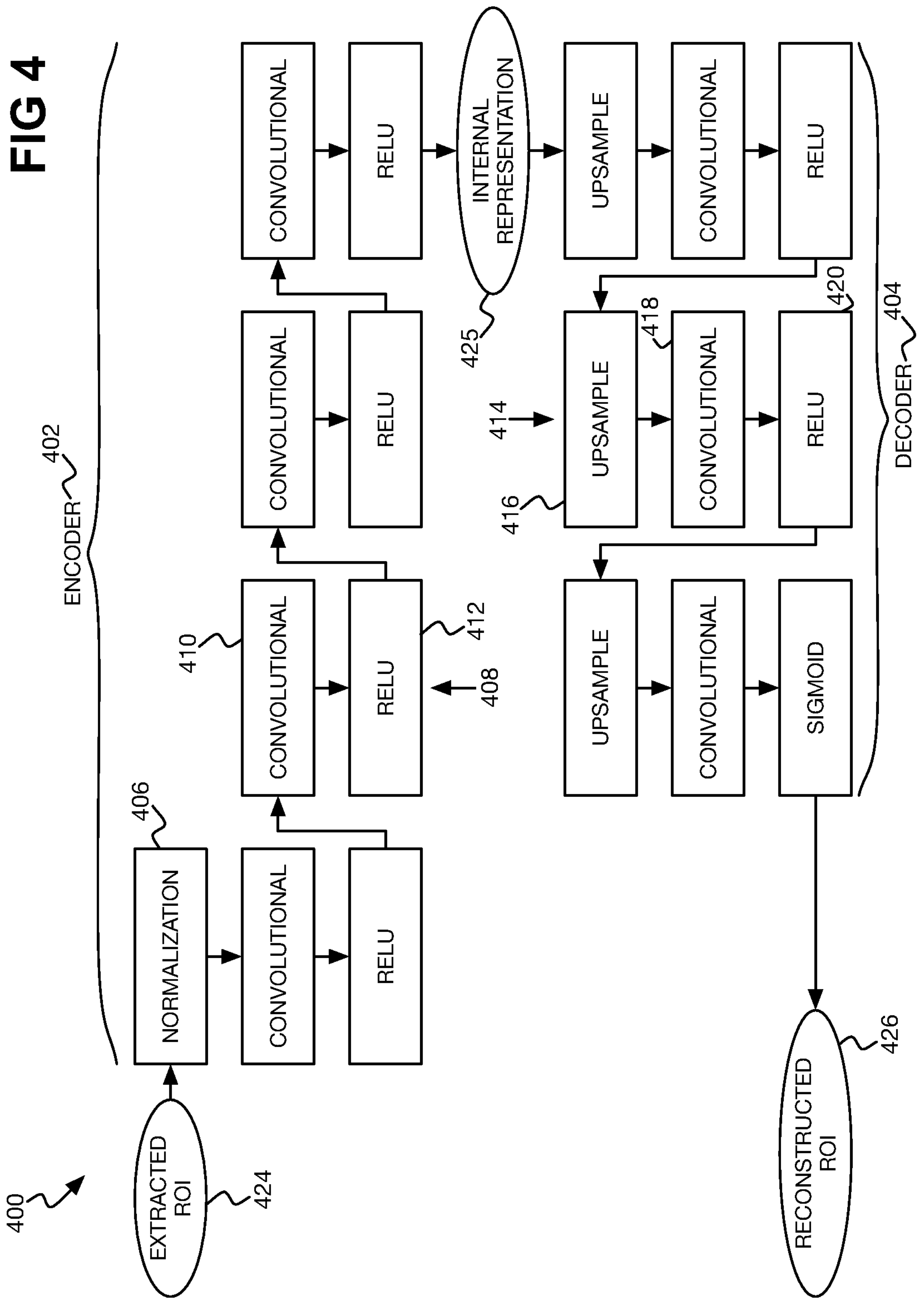
FIG. 4 is a diagram of an example autoencoder model to reconstruct an ROI from an extracted ROI of a captured image of a physical object.

FIG. 4 shows an example autoencoder model 400 that may be used in part 108. The autoencoder model 400 includes an encoder phase 402 and a decoder phase 404. The encoder phase 402 receives as input an extracted ROI 424 and provides as output an internal representation 425 of the extracted ROI 424. The encoder phase 402 includes a normalization layer 406 that normalizes the extracted ROI 424, followed by multiple layer pairs 408, such as four in the example of FIG. 4. Each layer pair 408 includes a convolutional layer 410 that abstracts its input as well as a rectified linear unit (ReLU) layer 412, which is an activation function that may linearize its input if positive and otherwise output zero. The resulting internal representation 425 is an abstracted encoding of the extracted ROI 424.

The decoder phase 402 in turn receives as input the internal representation 425 of the extracted ROI 424 and provides as output the reconstructed ROI 426. The reconstructed ROI 426 will faithfully correspond to the extracted ROI 424 at locations at which the ROI 424 does include anomalies like defects, since the autoencoder model 400 is trained on anomaly-free training images. However, at locations at which the extracted ROI 424 includes anomalies, the resulting reconstructed ROI 426 will less likely mirror the extracted ROI 424. The decoder phase 402 includes a number of upsampling convolutional layer groups 414, such as three in the example of FIG. 4. Each group 414 includes an upsampling layer 416 that increases the resolution of its input, followed by a convolutional layer 418, which is more specifically a deconvolutional layer that deabstracts its input. Each group 414 other than the last group 414 includes a ReLU layer 420, whereas the last group 414 includes a sigmoid layer 422 as a different type of activation layer.

Referring back to FIG. 1, the method 100 includes identifying the location of an anomaly of the physical object within the extracted ROI of the captured image, if any, based on the extracted and reconstructed ROIs (110). More generally, there may be zero, one, or multiple anomaly locations, and there may be one or multiple anomalies at each such location. To perform anomaly location identification, the method 100 can include first generating a residual map between the extracted ROI and the reconstructed ROI (112), such as by subtracting the value of each pixel of the reconstructed ROI from the value of the corresponding pixel of the extracted ROI.

The method 100 can include next removing any pixel of the residual map having a value less than a threshold (114). The threshold may be a static threshold or an adaptive threshold that is based on the residual map itself. As an example of an adaptive threshold, the threshold may be calculated as the mean of the values of the pixels of the residual map, plus a product of a parameter and the standard deviation of the values of the pixels of the residual map. The parameter may be prespecified, and governs the reconstruction error severity that is considered anomalous. For example, a higher parameter value indicates that less severe errors in the reconstructed ROI as compared to the extracted ROI are not considered anomalies, whereas a lower parameter values indicates that such less severe errors are considered anomalies.

The method 100 can include then applying a morphological operation to the residual map from which pixels having values less than the threshold have been removed (116). The morphological operation that is performed can include an opening morphological operation (118) and/or a closing morphological operation (120). The opening operation, which may also be considered an erosion operation, denoises the residual map of isolated extraneous pixels having values greater than the threshold but which may not in actuality correspond to anomalies. By comparison, the closing operation, which may be considered a dilation operation, connectively groups discontiguous pixels having values greater than the threshold and located near one another, so that they are considered as corresponding to the same anomaly.

The method 100 can include, if after morphological operation application the residual map includes any pixels having values greater than the threshold (122), determining that the physical object has anomalies like defects (124). The location the anomaly of the anomaly within the extracted ROI corresponds to the locations of the pixels having values greater than the threshold within the residual map. For instance, the location of each group of contiguous pixels having values greater than the threshold within the residual map may be considered as the location of a corresponding anomaly. The method 100 can include, if after morphological operation application the residual map does not include any pixels having values greater than the threshold (124), by comparison determining that the physical object does not have anomalies (126).

The method 100 can include outputting a segmentation mask that identifies the location of the anomaly of the physical object within the extracted ROI, if any (128). For example, the result of parts 112, 114, and 116 is a post-processed version of the residual map, in which there are white areas and black areas. The white areas correspond to the identified location of the anomaly of the physical object within the extracted ROI of the captured image of the physical object, whereas the black areas do not. This post-processed version of the residual map constitutes the segmentation mask. Therefore, the segmentation mask can be applied to the extracted ROI of the captured image to highlight the location of the anomaly of the physical object, if any.

Figure 5A:
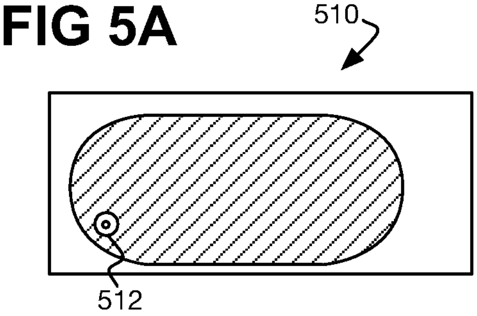
FIGS. 5A, 5B, 5C, 5D, and 5E are diagrams depicting example anomaly location identification within an extracted ROI of a captured image of a physical object.
Figure 5B:
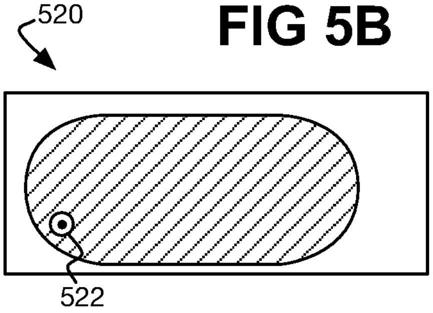

FIGS. 5A-5E show example performance of the anomaly location identification of part 110. FIG. 5A shows an example extracted ROI 510 of an encap of an inkjet cartridge having an anomaly at location 512. FIG. 5B shows an example reconstructed ROI 520 corresponding to the extracted ROI 510. The reconstructed ROI 520 is largely identical to the extracted ROI 510, except the reconstructed ROI 520 does not include the anomaly at the location 522 that corresponds to the location 512 in the extracted ROI 510.

Figure 5C:
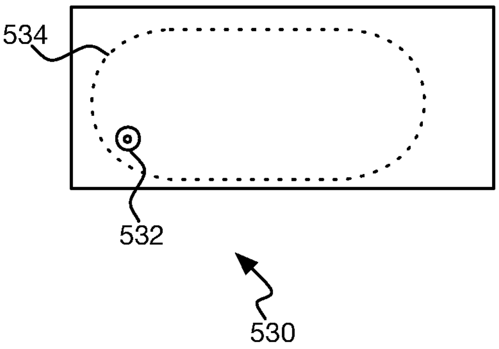

FIG. 5C shows the resulting residual map 530 between the extracted ROI 510 and the reconstructed ROI 520. The residual map 530 is black at locations where the ROIs 510 and 520 are identical. The residual map 530 highlights in white location 532 corresponding to the location 512 of the anomaly within the extracted ROI 510, but is also not black at other locations 534 as well. The locations 534 primarily correspond to the periphery of the encap at which the autoencoder model did not faithfully reproduce the extracted ROI 510 within the reconstructed ROI 520.

Figure 5D:
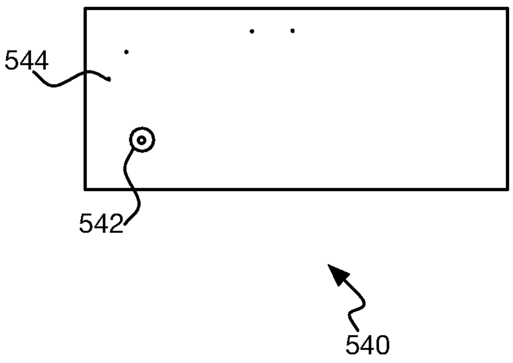
Figure 5E:

FIG. 5D shows the resulting residual map 540 after removing pixels having values less than the threshold from the residual map 530. The residual map 540 still highlights in white location 542 corresponding to the location 512 of the anomaly within the extracted ROI 510. However, most of the other non-black locations 534 of the residual map 530 have been removed in the residual map 540, although a few such locations 544 remain. FIG. 5E then shows the resulting residual map 550 after performing a morphological operation on the residual map 540, which removes all or nearly all of the remaining non-black locations other than location 552 that corresponds to the location 512 of the anomaly within the extracted ROI 510. As such, an anomaly is considered as having been detected at the location 552.

Figure 6:
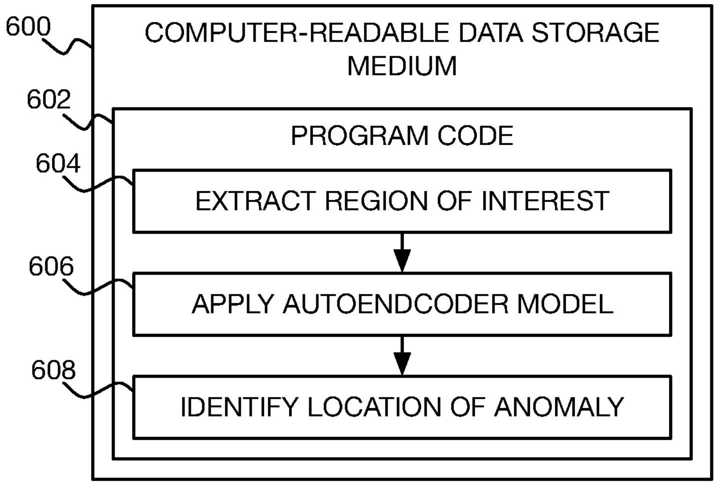
FIG. 6 is a diagram of an example non-transitory computer-readable data storage medium.

FIG. 6 shows an example non-transitory computer-readable data storage medium 600 storing program code 602. The program code 602 is executable by a processor of a computing device to perform processing. The processing includes extracting a region of interest from a captured image of a physical object (604), and applying an autoencoder model to the extracted region of interest to reconstruct the region of interest (606). The processing includes identifying a location of an anomaly of the physical object within the extracted region of interest, if any, based on the extracted and reconstructed regions of interest (608).

Figure 7:
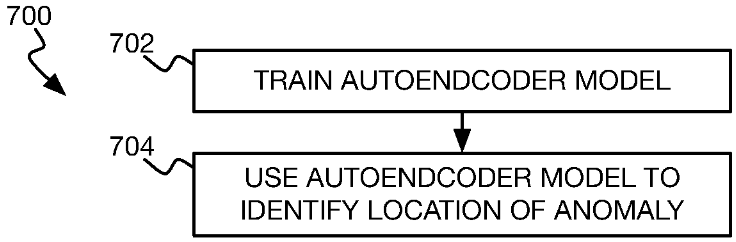
FIG. 7 is a flowchart of an example method.

FIG. 7 is a flowchart of an example method 700. The method 700 may be performed by a processor of a computing device, and may be implemented as program code stored on a non-transitory computer-readable data storage medium and executed by the processor. The method 700 includes training an autoencoder model using training images of anomaly-free physical objects of a same type (702). The method 700 includes using the autoencoder model to identify a location of an anomaly of a physical object of the same type as the anomaly-free physical objects within an extracted ROI of a captured image of the physical object (704).

Figure 8:
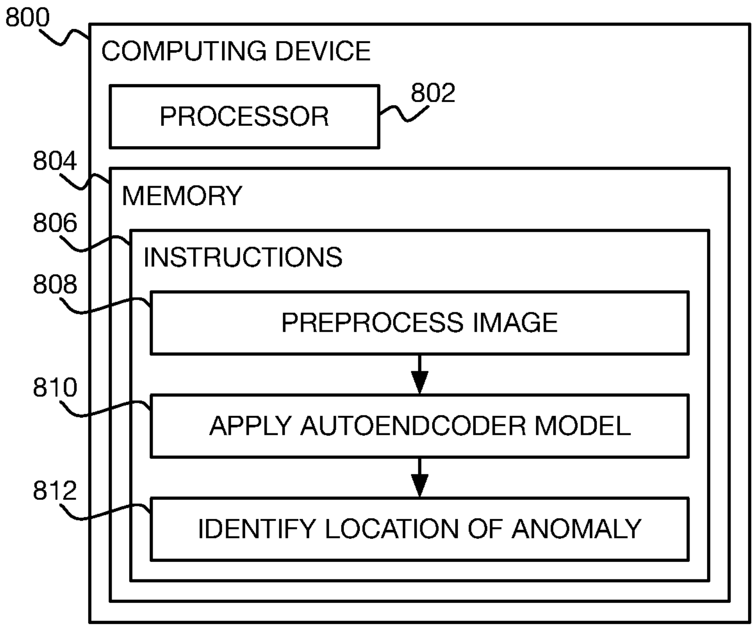
FIG. 8 is a diagram of an example computing device.

FIG. 8 shows an example computing device 800. The computing device 800 includes a processor 802 and memory 804 storing instructions 806. The instructions 806 are executable by the processor 802 to preprocess an image of a physical object to crop the image (808). The cropped image may be considered the extracted ROI of the image. The instructions 806 are executable by the processor 802 to apply an autoencoder model to the preprocessed image to generate a reconstructed image (810). The instructions 806 are executable by the processor 802 to identify a location of an anomaly of the physical object within the image, if any, based on a residual map between the preprocessed image and the reconstructed image (812).

Techniques have been described for detecting anomalies of physical objects within captured images and identifying the locations of the anomalies within the captured images. The techniques have been described in relation to encaps of inkjet cartridges as one type of physical object. However, the techniques are applicable to other types of physical objects as well, including other types of manufactured device components. The techniques provide for an automated manner of anomaly detection using an autoencoder model, in which a captured image is preprocessed to extract an ROI thereof and is postprocessed to better distinguish between noise and actual anomalies like defects.

We claim:

1. A non-transitory computer-readable data storage medium storing program code executable by a processor to perform processing comprising:

extracting a region of interest from a captured image of a physical object, wherein the region of interest is a prespecified area within the captured image that is to be input to an autoencoder model;

applying the autoencoder model to the extracted region of interest to reconstruct the region of interest; and identifying a location of an anomaly of the physical object within the extracted region of interest, if any, based on the extracted and reconstructed regions of interest, wherein identifying the location of the anomaly of the physical object within the extracted region of interest, if any, comprises generating a residual map between the extracted region of interest and the reconstructed region of interest.

2. The non-transitory computer-readable data storage medium of claim 1, wherein extracting the region of interest comprises:

aligning the captured image of the physical object against a reference image of another physical object of a same type as the physical object; and cropping the aligned captured image based on a bounding box identifying a corresponding region of interest within the reference image, wherein the cropped aligned captured image constitutes the region of interest.

3. The non-transitory computer-readable data storage medium of claim 2, wherein aligning the captured image against the reference image comprises calculating a transformation matrix that aligns the captured image to the reference image, and wherein cropping the aligned captured image based on the bounding box comprises applying an inverse of the transformation matrix to the bounding box and cropping the captured image using the inverse-applied bounding box.

4. The non-transitory computer-readable data storage medium of claim 1, wherein extracting the region of interest comprises:

applying an object segmentation model to the captured image.

5. The non-transitory computer-readable data storage medium of claim 4, wherein the object segmentation model is a regional convolutional neural network (R-CNN) trained using a plurality of training images of other physical objects of a same type as the physical object and on which corresponding regions of interest have been preidentified.

6. The non-transitory computer-readable data storage medium of claim 1, wherein the autoencoder model is trained on training images of anomaly-free physical objects of a same type as the physical object.

7. The non-transitory computer-readable data storage medium of claim 1, wherein identifying the location of the anomaly of the physical object within the extracted region of interest, if any, further comprises:

removing any pixel of the residual map having a value less than a threshold.

8. The non-transitory computer-readable data storage medium of claim 7, wherein the threshold is a static threshold.

9. The non-transitory computer-readable data storage medium of claim 7, wherein the threshold is an adaptive threshold calculated as a mean of values of pixels of the residual map, plus a product of a parameter and a standard deviation of the values of the pixels of the residual map, the parameter governing reconstruction error severity that is considered anomalous.

10. The non-transitory computer-readable data storage medium of claim 7, wherein identifying the location of the anomaly of the physical object within the extracted region of interest, if any, further comprises:

after removing any pixel having a value less than the threshold, applying a morphological operation to the residual map.

11. The non-transitory computer-readable data storage medium of claim 10, wherein applying the morphological operation to the residual map comprises:

applying an opening morphological operation to denoise the residual map of extraneous pixels having values greater than the threshold; and applying a closing morphological operation to connectively group discontiguous pixels having values greater than the threshold.

12. The non-transitory computer-readable data storage medium of claim 7, wherein identifying the location of the anomaly of the physical object within the extracted region of interest, if any, further comprises:

determining that the physical object includes the anomaly if the residual map includes any pixels having values greater than the threshold, wherein the location of the anomaly of the physical object within the extracted region corresponds to locations of pixels having values greater than the threshold within the residual map.

13. The non-transitory computer-readable data storage medium of claim 12, wherein identifying the location of the anomaly of the physical object within the extracted region of interest, if any, further comprises:

determining that the physical object does not include any anomaly if the residual map does not include any pixels having values greater than the threshold.

14. A method comprising:

training an autoencoder model using a plurality of training images of anomaly-free physical objects of a same type; and using the autoencoder model to identify a location of an anomaly of a physical object of the same type as the anomaly-free physical objects within an extracted region of interest of a captured image of the physical object, wherein the region of interest is a prespecified area within the captured image that is to be input to the autoencoder model, wherein using the autoencoder model to identify the location of the anomaly of the physical object within the extracted region of interest comprises generating a residual map between the extracted region of interest and a reconstructed region of interest generated by the autoencoder model based on the captured image.

15. A computing device comprising:

a processor; and a memory storing instructions executable by the processor to:

preprocess an image of a physical object to crop the image to extract a region of interest, wherein the region of interest is a prespecified area within the captured image that is to be input to an autoencoder model;

apply the autoencoder model to the preprocessed image to generate a reconstructed image; and identify a location of an anomaly of the physical object within the image, if any, based on a residual map between the preprocessed image and the reconstructed image.

16. The method of claim 14, wherein using the autoencoder model to identify the location of the anomaly of the physical object within the extracted region of interest further comprises:

removing any pixel of the residual map having a value less than a threshold.

17. The method of claim 16, wherein the threshold is an adaptive threshold calculated as a mean of values of pixels of the residual map, plus a product of a parameter and a standard deviation of the values of the pixels of the residual map, the parameter governing reconstruction error severity that is considered anomalous.

18. The method of claim 16, wherein using the autoencoder model to identify the location of the anomaly of the physical object within the extracted region of interest further comprises:

after removing any pixel having a value less than the threshold, applying a morphological operation to the residual map.

19. The computing device of claim 15, wherein the processor is to preprocess the image of the physical object by:

extracting a region of interest from the image of the physical object.

20. The computing device of claim 19, wherein the processor is to extract the region of interest by:

applying an object segmentation model to the image of the physical object.

* * * * *